United States Patent
Patel et al.

(10) Patent No.: US 11,364,913 B2
(45) Date of Patent: Jun. 21, 2022

(54) SITUATIONAL COMPLEXITY QUANTIFICATION FOR AUTONOMOUS SYSTEMS

(71) Applicant: GM GLOBAL TECHNOLOGY OPERATIONS LLC, Detroit, MI (US)

(72) Inventors: Aashish N. Patel, Los Angeles, CA (US); Hyukseong Kwon, Thousand Oaks, CA (US); Amir M. Rahimi, Malibu, CA (US); Rajan Bhattacharyya, Sherman Oaks, CA (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 461 days.

(21) Appl. No.: 16/365,447

(22) Filed: Mar. 26, 2019

(65) Prior Publication Data

US 2020/0307586 A1    Oct. 1, 2020

(51) Int. Cl.
*B60W 30/182* (2020.01)
*G05D 1/00* (2006.01)
*G05D 1/02* (2020.01)

(52) U.S. Cl.
CPC ......... *B60W 30/182* (2013.01); *G05D 1/0088* (2013.01); *G05D 1/0214* (2013.01); *G05D 2201/0213* (2013.01)

(58) Field of Classification Search
CPC .................................................. B60W 30/182
See application file for complete search history.

(56) References Cited

U.S. PATENT DOCUMENTS

| 6,580,984 B2 | 6/2003 | Fecher et al. |
| 8,340,866 B2 | 12/2012 | Hanzawa et al. |
| 8,538,785 B2 | 9/2013 | Coleman et al. |
| 2011/0043635 A1 | 2/2011 | Fujita et al. |
| 2018/0001890 A1* | 1/2018 | Ratcliffe ............ B60W 30/095 |

FOREIGN PATENT DOCUMENTS

| CN | 107672597 A | * | 2/2018 |
| DE | 102007018517 A1 | | 10/2008 |
| EP | 2138987 A1 | | 12/2009 |

OTHER PUBLICATIONS

Pendleton et al., "Perception, Planning, Control, and Coordination for Autonomous Vehicles", Feb. 17, 2017, MDPI, Machines 2017, 5, 6; doi:10.3390/machines5010006 (Year: 2017).*
Wikipedia, "Normal distribution", Mar. 2018, https://web.archive.org/web/20180301211050/https://en.wikipedia.org/wiki/Normal_distribution (Year: 2018).*

(Continued)

*Primary Examiner* — Elaine Gort
*Assistant Examiner* — Tarek Elarabi
(74) *Attorney, Agent, or Firm* — Cantor Colburn LLP

(57) ABSTRACT

A method, autonomous vehicle and system for operating an autonomous vehicle. A sensor obtains data of an agent. A processor determines a measure of complexity of the environment in which the autonomous vehicle is operating from the sensor data, selects a control scheme for operating the autonomous vehicle based on the determined complexity, and operates the autonomous vehicle using the selected control scheme.

14 Claims, 4 Drawing Sheets

(56) References Cited

OTHER PUBLICATIONS

Wikipedia, "Sensor fusion", Mar. 2017, https://web.archive.org/web/20180301211050/https://en.wikipedia.org/wiki/Normal_distribution (Year: 2017).*

"Surface Vehicle Recommended Practice: Taxonomy and Definitions for Terms Related to Driving Automation Systems for On-Road Motor Vehicles"; SAE International; J3016; Sep. 2016; 30 Pages.

Fastenmeier et al.; "Driving Task Analysis as a Tool in Tiaflic Safety Research and Practice"; Science Direct; Safety Science 45; 2007; pp. 952-979.

Muir et al.; "Trust in Automation. Part II. Experimental Studies of Trust and Human Intervention in a Process Control Simulation"; Ergonomics; vol. 39, No. 3; 1996; pp. 429-460.

\* cited by examiner

SITUATIONAL COMPLEXITY QUANTIFICATION FOR AUTONOMOUS SYSTEMS

The subject disclosure relates to autonomous vehicles and, in particular, to a system and method for calculating a situational complexity within a neighborhood of the autonomous vehicle in order to operate the autonomous vehicle.

Autonomous vehicles are intended to move a passenger from one place to another with no or minimal input from the passenger. Such vehicles require the ability to obtain knowledge about agents in its environment and their possible motions and to calculate a trajectory for the autonomous vehicle based on this knowledge. A processor can be used in the autonomous vehicle to determine the location of agents in the neighborhood of the vehicle, predict their immediate actions and prepare a driving decision based on these predictions. The computational burden on the processor increases as the complexity of a given driving scenario increases, which can affect the ability of the processor to operate the autonomous vehicle effectively. Therefore there is a need to determine a complexity of a driving scenario in order to change processing methods accordingly.

SUMMARY

In one exemplary embodiment, a method of operating an autonomous vehicle is disclosed. Sensor data related to an agent is received at a processor of the autonomous vehicle. A measure of complexity of the environment in which the autonomous vehicle is operating is determined from the sensor at the processor. A control scheme is selected for operating the autonomous vehicle based on the determined complexity. The autonomous vehicle is operated using the selected control scheme.

In addition to one or more of the features described herein, the complexity is at least one of a temporal complexity and a spatial complexity. The spatial complexity is a product of a velocity-based complexity and a heading-based complexity. The complexity is determined based on a calculation of an area of an occluded region of the environment. The method further includes obtaining the temporal complexity by integrating a plurality of spatial complexities, with each spatial complexity representing a spatial complexity at a selected time. The method further includes scaling each of the plurality of spatial complexities according to a temporal kernel. The temporal kernel provides greater weight to a spatial complexity from a recent time and less weight to a spatial complexity from a distant time.

In another exemplary embodiment, a cognitive system for operating an autonomous vehicle is disclosed. The autonomous vehicle includes a sensor and a processor. The sensor is configured to obtain data of an agent. The processor is configured to determine a measure of complexity of the environment in which the autonomous vehicle is operating from the sensor data, select a control scheme for operating the autonomous vehicle based on the determined complexity, and operate the autonomous vehicle using the selected control scheme.

In addition to one or more of the features described herein, the complexity is at least one of a temporal complexity and a spatial complexity. The processor is further configured to determine the spatial complexity as a product of a velocity-based complexity and a heading-based complexity. The processor is further configured to determine the complexity based on a calculation of an area of an occluded region of the environment. The processor is further configured to determine the temporal complexity by integrating a plurality of spatial complexities, each spatial complexity representing a spatial complexity at a selected time. The processor is further configured to scale each of the plurality of spatial complexities according to a temporal kernel. The temporal kernel provides greater weight to a spatial complexity from a recent time and less weight to a spatial complexity from a distant time.

In yet another exemplary embodiment, an autonomous vehicle is disclosed. The autonomous vehicle includes a sensor and a processor. The sensor is configured to obtain data of an agent. The processor is configured to determine a measure of complexity of the environment in which the autonomous vehicle is operating from the sensor data, select a control scheme for operating the autonomous vehicle based on the determined complexity, and operate the autonomous vehicle using the selected control scheme.

In addition to one or more of the features described herein, the complexity is at least one of a temporal complexity and a spatial complexity. The processor is further configured to determine the spatial complexity as a product of a velocity-based complexity and a heading-based complexity. The processor is further configured to determine the spatial complexity based on a calculation of an area of an occluded region of the environment. The processor is further configured to determine the temporal complexity by integrating a plurality of spatial complexities, each spatial complexity representing a spatial complexity at a selected time. The processor is further configured to scale each of the plurality of spatial complexities according to a temporal kernel that provides greater weight to a spatial complexity from a recent time and less weight to a spatial complexity from a distant time.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
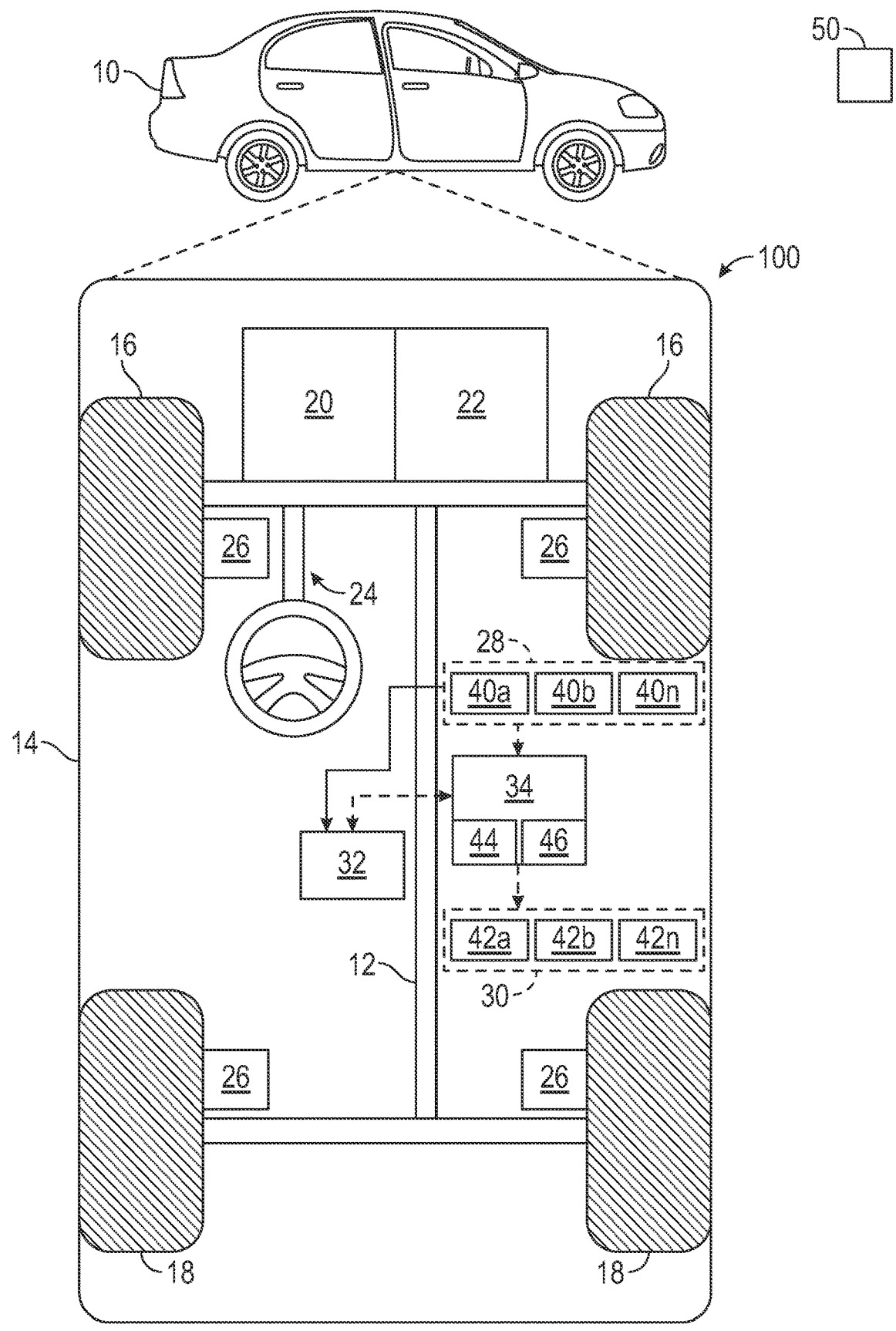
FIG. 1 shows an autonomous vehicle with an associated trajectory planning system depicted in accordance with various embodiments.

The following description is merely exemplary in nature and is not intended to limit the present disclosure, its application or uses. It should be understood that throughout the drawings, corresponding reference numerals indicate like or corresponding parts and features. As used herein, the term module refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

In accordance with an exemplary embodiment, FIG. 1 shows an autonomous vehicle 10 with an associated trajectory planning system depicted at 100 in accordance with various embodiments. In general, the trajectory planning system 100 determines a trajectory plan for automated driving of the autonomous vehicle 10. The autonomous vehicle 10 generally includes a chassis 12, a body 14, front wheels 16, and rear wheels 18. The body 14 is arranged on the chassis 12 and substantially encloses components of the autonomous vehicle 10. The body 14 and the chassis 12 may jointly form a frame. The wheels 16 and 18 are each rotationally coupled to the chassis 12 near respective corners of the body 14.

In various embodiments, the trajectory planning system 100 is incorporated into the autonomous vehicle 10. The autonomous vehicle 10 is, for example, a vehicle that is automatically controlled to carry passengers from one location to another. The autonomous vehicle 10 is depicted in the illustrated embodiment as a passenger car, but it should be appreciated that any other vehicle including motorcycles, trucks, sport utility vehicles (SUVs), recreational vehicles (RVs), etc., can also be used. At various levels, an autonomous vehicle can assist the driver through a number of methods, such as warning signals to indicate upcoming risky situations, indicators to augment situational awareness of the driver by predicting movement of other agents warning of potential collisions, etc. The autonomous vehicle has different levels of intervention or control of the vehicle through coupled assistive vehicle control all the way to full control of all vehicle functions. In an exemplary embodiment, the autonomous vehicle 10 is a so-called Level Four or Level Five automation system. A Level Four system indicates "high automation", referring to the driving mode-specific performance by an automated driving system of all aspects of the dynamic driving task, even if a human driver does not respond appropriately to a request to intervene. A Level Five system indicates "full automation", referring to the full-time performance by an automated driving system of all aspects of the dynamic driving task under all roadway and environmental conditions that can be managed by a human driver.

As shown, the autonomous vehicle 10 generally includes a propulsion system 20, a transmission system 22, a steering system 24, a brake system 26, a sensor system 28, an actuator system 30, a cognitive processor 32, and at least one controller 34. The propulsion system 20 may, in various embodiments, include an internal combustion engine, an electric machine such as a traction motor, and/or a fuel cell propulsion system. The transmission system 22 is configured to transmit power from the propulsion system 20 to the vehicle wheels 16 and 18 according to selectable speed ratios. According to various embodiments, the transmission system 22 may include a step-ratio automatic transmission, a continuously-variable transmission, or other appropriate transmission. The brake system 26 is configured to provide braking torque to the vehicle wheels 16 and 18. The brake system 26 may, in various embodiments, include friction brakes, brake by wire, a regenerative braking system such as an electric machine, and/or other appropriate braking systems. The steering system 24 influences a position of the vehicle wheels 16 and 18. While depicted as including a steering wheel for illustrative purposes, in some embodiments contemplated within the scope of the present disclosure, the steering system 24 may not include a steering wheel.

The sensor system 28 includes one or more sensing devices 40a-40n that sense observable conditions of the exterior environment and/or the interior environment of the autonomous vehicle 10. The sensing devices 40a-40n can include, but are not limited to, radars, lidars, global positioning systems, optical cameras, thermal cameras, ultrasonic sensors, and/or other sensors. The sensing devices 40a-40n obtain measurements or data related to various objects or agents 50 within the vehicle's environment. Such agents 50 can be, but are not limited to, other vehicles, pedestrians, bicycles, motorcycles, etc., as well as non-moving objects. The sensing devices 40a-40n can also obtain traffic data, such as information regarding traffic signals and signs, etc.

The actuator system 30 includes one or more actuator devices 42a-42n that control one or more vehicle features such as, but not limited to, the propulsion system 20, the transmission system 22, the steering system 24, and the brake system 26. In various embodiments, the vehicle features can further include interior and/or exterior vehicle features such as, but not limited to, doors, a trunk, and cabin features such as ventilation, music, lighting, etc. (not numbered).

The controller 34 includes at least one processor 44 and a computer readable storage device or media 46. The processor 44 can be any custom made or commercially available processor, a central processing unit (CPU), a graphics processing unit (GPU), an auxiliary processor among several processors associated with the controller 34, a semiconductor based microprocessor (in the form of a microchip or chip set), a macroprocessor, any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the autonomous vehicle 10.

The instructions may include one or more separate programs, each of which includes an ordered listing of executable instructions for implementing logical functions. The instructions, when executed by the processor 44, receive and process signals from the sensor system 28, perform logic, calculations, methods and/or algorithms for automatically controlling the components of the autonomous vehicle 10, and generate control signals to the actuator system 30 to automatically control the components of the autonomous vehicle 10 based on the logic, calculations, methods, and/or algorithms.

The controller 34 is further in communication with the cognitive processor 32. The cognitive processor 32 receives various data from the controller 34 and from the sensing devices 40a-40n of the sensor system 28 and performs various calculations in order to provide a trajectory to the controller 34 for the controller 34 to implement at the autonomous vehicle 10 via the one or more actuator devices 42a-42n. A detailed discussion of the cognitive processor 32 is provided with respect to FIG. 2.

Figure 2:
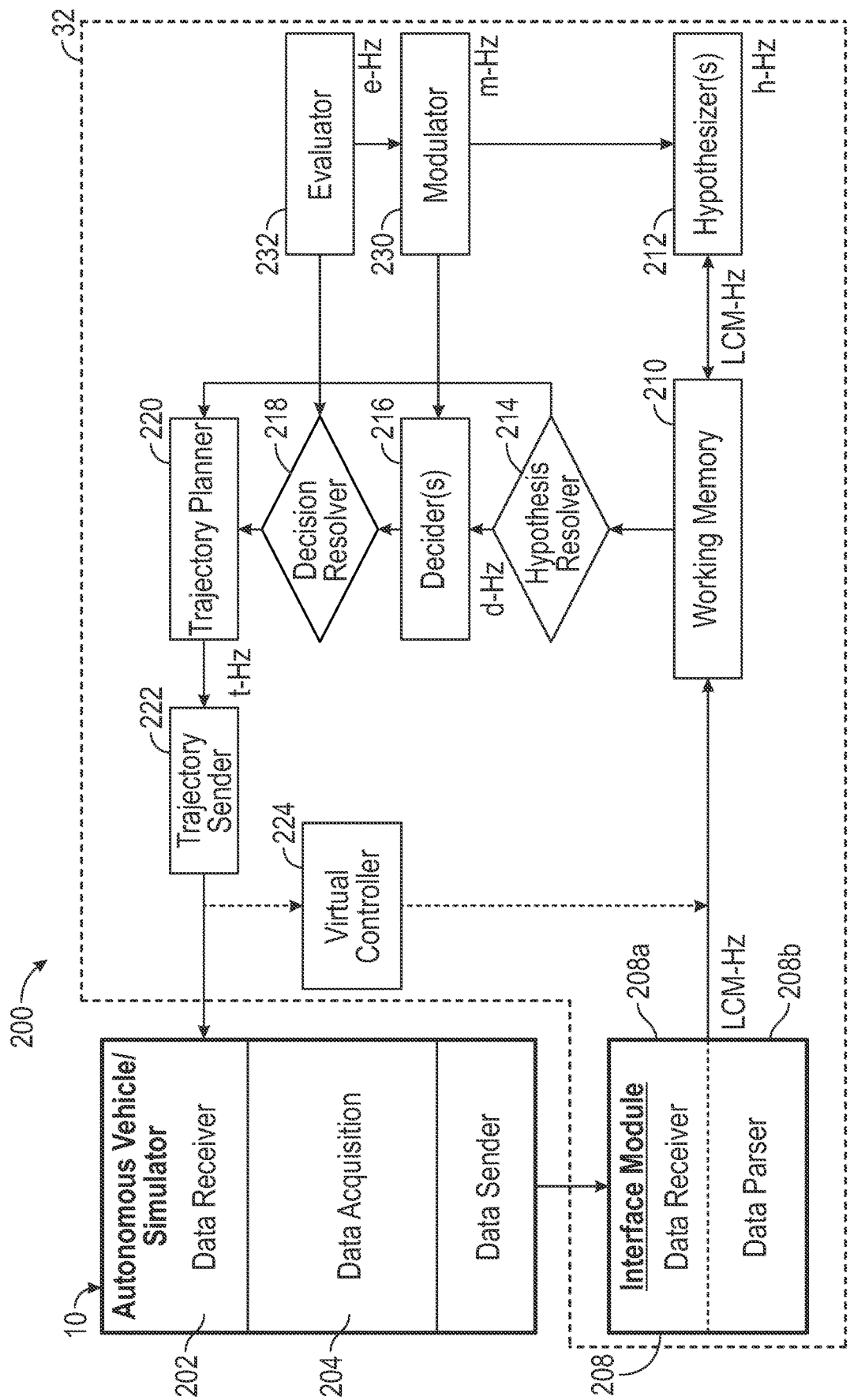
FIG. 2 shows an illustrative control system including a cognitive processor integrated with an autonomous vehicle or vehicle simulator.

FIG. 2 shows an illustrative control system 200 including a cognitive processor 32 integrated with an autonomous vehicle 10. In various embodiment the autonomous vehicle 10 can be a vehicle simulator that simulates various driving scenarios for the autonomous vehicle 10 and simulates various response of the autonomous vehicle 10 to the scenarios.

The autonomous vehicle 10 includes a data acquisition system 204 (e.g., sensors 40a-40n of FIG. 1). The data acquisition system 204 obtains various data for determining a state of the autonomous vehicle 10 and various agents in the environment of the autonomous vehicle 10. Such data includes, but is not limited to, kinematic data, position or pose data, etc., of the autonomous vehicle 10 as well as data about other agents, including as range, relative speed (Doppler), elevation, angular location, etc. The autonomous vehicle 10 further includes a sending module 206 that packages the acquired data and sends the packaged data to the communication interface 208 of the cognitive processor 32, as discussed below. The autonomous vehicle 10 further includes a receiving module 202 that receives operating commands from the cognitive processor 32 and performs the commands at the autonomous vehicle 10 to navigate the autonomous vehicle 10. The cognitive processor 32 receives the data from the autonomous vehicle 10, computes a trajectory for the autonomous vehicle 10 based on the provided state information and the methods disclosed herein and provides the trajectory to the autonomous vehicle 10 at the receiving module 202. The autonomous vehicle 10 then implements the trajectory provided by the cognitive processor 32.

The cognitive processor 32 includes various modules for communication with the autonomous vehicle 10, including an interface module 208 for receiving data from the autonomous vehicle 10 and a trajectory sender 222 for sending instructions, such as a trajectory to the autonomous vehicle 10. The cognitive processor 32 further includes a working memory 210 that stores various data received from the autonomous vehicle 10 as well as various intermediate calculations of the cognitive processor 32. A hypothesizer module(s) 212 of the cognitive processor 32 is used to propose various hypothetical trajectories and motions of one or more agents in the environment of the autonomous vehicle 10 using a plurality of possible prediction methods and state data stored in working memory 210. A hypothesis resolver 214 of the cognitive processor 32 receives the plurality of hypothetical trajectories for each agent in the environment and determines a most likely trajectory for each agent from the plurality of hypothetical trajectories.

The cognitive processor 32 further includes one or more decider modules 216 and a decision resolver 218. The decider module(s) 216 receives the most likely trajectory for each agent in the environment from the hypothesis resolver 214 and calculates a plurality of candidate trajectories and behaviors for the autonomous vehicle 10 based on the most likely agent trajectories. Each of the plurality of candidate trajectories and behaviors is provided to the decision resolver 218. The decision resolver 218 selects or determines an optimal or desired trajectory and behavior for the autonomous vehicle 10 from the candidate trajectories and behaviors.

The cognitive processor 32 further includes a trajectory planner 220 that determines an autonomous vehicle trajectory that is provided to the autonomous vehicle 10. The trajectory planner 220 receives the vehicle behavior and trajectory from the decision resolver 218, an optimal hypothesis for each agent 50 from the hypothesis resolver 214, and the most recent environmental information in the form of "state data" to adjust the trajectory plan. This additional step at the trajectory planner 220 ensures that any anomalous processing delays in the asynchronous computation of agent hypotheses is checked against the most recent sensed data from the data acquisition system 204. This additional step updates the optimal hypothesis accordingly in the final trajectory computation in the trajectory planner 220.

The determined vehicle trajectory is provided from the trajectory planner 220 to the trajectory sender 222 which provides a trajectory message to the autonomous vehicle 10 (e.g., at controller 34) for implementation at the autonomous vehicle 10.

The cognitive processor 32 further includes a modulator 230 that controls various limits and thresholds for the hypothesizer module(s) 212 and decider module(s) 216. The modulator 230 can also apply changes to parameters for the hypothesis resolver 214 to affect how it selects the optimal hypothesis object for a given agent 50, deciders, and the decision resolver. The modulator 230 is a discriminator that makes the architecture adaptive. The modulator 230 can change the calculations that are performed as well as the actual result of deterministic computations by changing parameters in the algorithms themselves.

An evaluator module 232 of the cognitive processor 32 computes and provides contextual information to the cognitive processor including error measures, hypothesis confidence measures, measures on the complexity of the environment and autonomous vehicle 10 state, performance evaluation of the autonomous vehicle 10 given environmental information including agent hypotheses and autonomous vehicle trajectory (either historical, or future). The modulator 230 receives information from the evaluator 232 to compute changes to processing parameters for hypothesizers 212, the hypothesis resolver 214, the deciders 216, and threshold decision resolution parameters to the decision resolver 218. A virtual controller 224 implements the trajectory message and determines a feedforward trajectory of various agents 50 in response to the trajectory.

Modulation occurs as a response to uncertainty as measured by the evaluator module 232. In one embodiment, the modulator 230 receives confidence levels associated with hypothesis objects. These confidence levels can be collected from hypothesis objects at a single point in time or over a selected time window. The time window may be variable. The evaluator module 232 determines the entropy of the distribution of these confidence levels. In addition, historical error measures on hypothesis objects can also be collected and evaluated in the evaluator module 232.

These types of evaluations serve as an internal context and measure of uncertainty for the cognitive processor 32. These contextual signals from the evaluator module 232 are utilized for the hypothesis resolver 214, decision resolver, 218, and modulator 230 which can change parameters for hypothesizer modules 212 based on the results of the calculations.

The various modules of the cognitive processor 32 operate independently of each other and are updated at individual update rates (indicated by, for example, LCM-Hz, h-Hz, d-Hz, e-Hz, m-Hz, t-Hz in FIG. 2).

In operation, the interface module 208 of the cognitive processor 32 receives the packaged data from the sending module 206 of the autonomous vehicle 10 at a data receiver 208a and parses the received data at a data parser 208b. The data parser 208b places the data into a data format, referred to herein as a property bag, that can be stored in working memory 210 and used by the various hypothesizer modules 212, decider modules 216, etc. of the cognitive processor 32. The particular class structure of these data formats should not be considered a limitation of the invention.

Working memory 210 extracts the information from the collection of property bags during a configurable time window to construct snapshots of the autonomous vehicle and various agents. These snapshots are published with a fixed frequency and pushed to subscribing modules. The data structure created by working memory 210 from the property bags is a "State" data structure which contains information organized according to timestamp. A sequence of generated snapshots therefore encompass dynamic state information for another vehicle or agent. Property bags within a selected State data structure contain information about objects, such as other agents, the autonomous vehicle, route information, etc. The property bag for an object contains detailed information about the object, such as the object's location, speed, heading angle, etc. This state data structure flows throughout the rest of the cognitive processor 32 for computations. State data can refer to autonomous vehicle states as well as agent states, etc.

The hypothesizer module(s) 212 pulls State data from the working memory 210 in order to compute possible outcomes of the agents in the local environment over a selected time frame or time step. Alternatively, the working memory 210 can push State data to the hypothesizer module(s) 212. The hypothesizer module(s) 212 can include a plurality of hypothesizer modules, with each of the plurality of hypothesizer modules employing a different method or technique for determining the possible outcome of the agent(s). One hypothesizer module may determine a possible outcome using a kinematic model that applies basic physics and mechanics to data in the working memory 210 in order to predict a subsequent state of each agent 50. Other hypothesizer modules may predict a subsequent state of each agent 50 by, for example, employing a kinematic regression tree to the data, applying a Gaussian Mixture Model/Markovian mixture model (GMM-HMM) to the data, applying a recursive neural network (RNN) to the data, other machine learning processes, performing logic based reasoning on the data, etc. The hypothesizer modules 212 are modular components of the cognitive processor 32 and can be added or removed from the cognitive processor 32 as desired.

Each hypothesizer module 212 includes a hypothesis class for predicting agent behavior. The hypothesis class includes specifications for hypothesis objects and a set of algorithms. Once called, a hypothesis object is created for an agent from the hypothesis class. The hypothesis object adheres to the specifications of the hypothesis class and uses the algorithms of the hypothesis class. A plurality of hypothesis objects can be run in parallel with each other. Each hypothesizer module 212 creates its own prediction for each agent 50 based on the working current data and sends the prediction back to the working memory 210 for storage and for future use. As new data is provided to the working memory 210, each hypothesizer module 212 updates its hypothesis and pushes the updated hypothesis back into the working memory 210. Each hypothesizer module 212 can choose to update its hypothesis at its own update rate (e.g., rate h-Hz). Each hypothesizer module 212 can individually act as a subscription service from which its updated hypothesis is pushed to relevant modules.

Each hypothesis object produced by a hypothesizer module 212 is a prediction in the form of a state data structure for a vector of time, for defined entities such as a location, speed, heading, etc. In one embodiment, the hypothesizer module(s) 212 can contain a collision detection module which can alter the feedforward flow of information related to predictions. Specifically, if a hypothesizer module 212 predicts a collision of two agents 50, another hypothesizer module may be invoked to produce adjustments to the hypothesis object in order to take into account the expected collision or to send a warning flag to other modules to attempt to mitigate the dangerous scenario or alter behavior to avoid the dangerous scenario.

For each agent 50, the hypothesis resolver 118 receives the relevant hypothesis objects and selects a single hypothesis object from the hypothesis objects. In one embodiment, the hypothesis resolver 118 invokes a simple selection process. Alternatively, the hypothesis resolver 118 can invoke a fusion process on the various hypothesis objects in order to generate a hybrid hypothesis object.

Since the architecture of the cognitive processor is asynchronous, if a computational method implemented as a hypothesis object takes longer to complete, then the hypothesis resolver 118 and downstream decider modules 216 receive the hypothesis object from that specific hypothesizer module at an earliest available time through a subscription-push process. Time stamps associated with a hypothesis object informs the downstream modules of the relevant time frame for the hypothesis object, allowing for synchronization with hypothesis objects and/or state data from other modules. The time span for which the prediction of the hypothesis object applies is thus aligned temporally across modules.

For example, when a decider module 216 receives a hypothesis object, the decider module 216 compares the time stamp of the hypothesis object with a time stamp for most recent data (i.e., speed, location, heading, etc.) of the autonomous vehicle 10. If the time stamp of the hypothesis object is considered too old (e.g., pre-dates the autonomous vehicle data by a selected time criterion) the hypothesis object can be disregarded until an updated hypothesis object is received. Updates based on most recent information are also performed by the trajectory planner 220.

The decider module(s) 216 includes modules that produces various candidate decisions in the form of trajectories and behaviors for the autonomous vehicle 10. The decider module(s) 216 receives a hypothesis for each agent 50 from the hypothesis resolver 214 and uses these hypotheses and a nominal goal trajectory for the autonomous vehicle 10 as constraints. The decider module(s) 216 can include a plurality of decider modules, with each of the plurality of decider modules using a different method or technique for determining a possible trajectory or behavior for the autonomous vehicle 10. Each decider module can operate asynchronously and receives various input states from working memory 212, such as the hypothesis produced by the hypothesis resolver 214. The decider module(s) 216 are modular components and can be added or removed from the cognitive processor 32 as desired. Each decider module 216 can update its decisions at its own update rate (e.g., rate d-Hz).

Similar to a hypothesizer module 212, a decider module 216 includes a decider class for predicting an autonomous vehicle trajectory and/or behavior. The decider class includes specifications for decider objects and a set of algorithms. Once called, a decider object is created for an agent 50 from the decider class. The decider object adheres to the specifications of the decider class and uses the algorithm of the decider class. A plurality of decider objects can be run in parallel with each other.

The decision resolver 218 receives the various decisions generated by the one or more decider modules and produces a single trajectory and behavior object for the autonomous vehicle 10. The decision resolver can also receive various contextual information from evaluator modules 232, wherein the contextual information is used in order to produce the trajectory and behavior object.

The trajectory planner 220 receives the trajectory and behavior objects from the decision resolver 218 along with the state of the autonomous vehicle 10. The trajectory planner 220 then generates a trajectory message that is provided to the trajectory sender 222. The trajectory sender 222 provides the trajectory message to the autonomous vehicle 10 for implementation at the autonomous vehicle 10, using a format suitable for communication with the autonomous vehicle 10.

The trajectory sender 222 also sends the trajectory message to virtual controller 224. The virtual controller 224 provides data in a feed-forward loop for the cognitive processor 32. The trajectory sent to the hypothesizer module(s) 212 in subsequent calculations are refined by the virtual controller 224 to simulate a set of future states of the autonomous vehicle 10 that result from attempting to follow the trajectory. These future states are used by the hypothesizer module(s) 212 to perform feed-forward predictions.

Various aspects of the cognitive processor 32 provide feedback loops. A first feedback loop is provided by the virtual controller 224. The virtual controller 224 simulates an operation of the autonomous vehicle 10 based on the provided trajectory and determines or predicts future states taken by each agent 50 in response to the trajectory taken by the autonomous vehicle 10. These future states of the agents can be provided to the hypothesizer modules as part of the first feedback loop.

A second feedback loop occurs because various modules will use historical information in their computations in order to learn and update parameters. Hypothesizer module(s) 212, for example, can implement their own buffers in order to store historical state data, whether the state data is from an observation or from a prediction (e.g., from the virtual controller 224). For example, in a hypothesizer module 212 that employs a kinematic regression tree, historical observation data for each agent is stored for several seconds and used in the computation for state predictions.

The hypothesis resolver 214 also has feedback in its design as it also utilizes historical information for computations. In this case, historical information about observations is used to compute prediction errors in time and to adapt hypothesis resolution parameters using the prediction errors. A sliding window can be used to select the historical information that is used for computing prediction errors and for learning hypothesis resolution parameters. For short term learning, the sliding window governs the update rate of the parameters of the hypothesis resolver 214. Over larger time scales, the prediction errors can be aggregated during a selected episode (such as a left turn episode) and used to update parameters after the episode.

The decision resolver 218 also uses historical information for feedback computations. Historical information about the performance of the autonomous vehicle trajectories is used to compute optimal decisions and to adapt decision resolution parameters accordingly. This learning can occur at the decision resolver 218 at multiple time scales. In a shortest time scale, information about performance is continuously computed using evaluator modules 232 and fed back to the decision resolver 218. For instance, an algorithm can be used to provide information on the performance of a trajectory provided by a decider module based on multiple metrics as well as other contextual information. This contextual information can be used as a reward signal in reinforcement learning processes for operating the decision resolver 218 over various time scales. Feedback can be asynchronous to the decision resolver 218, and the decision resolver 218 can adapt upon receiving the feedback.

Figure 3:
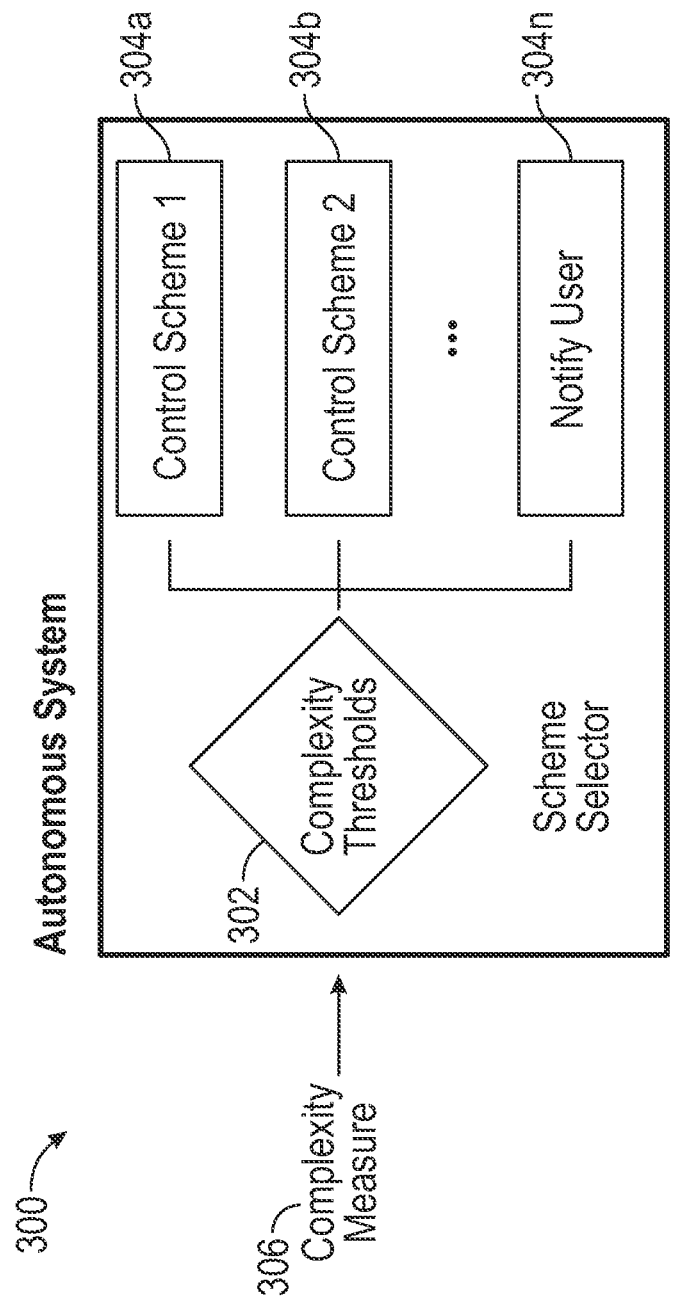
FIG. 3 shows a schematic diagram of an autonomous system including multiple control schemes for controlling the vehicle based on a complexity of a scene.

FIG. 3 shows a schematic diagram of an autonomous system 300 including multiple control schemes for controlling the vehicle based on a complexity of a scene. The autonomous system includes a plurality of control schemes (control scheme 1 (304a), control scheme 2 (304b), . . . , "Notify User" (304n). The control schemes are arranged in order of scene complexity, with control scheme 1 (304a) capable of controlling the autonomous vehicle in scenes of relatively low complexity, control scheme 2 (304b) capable of controlling the autonomous vehicle in scenes of greater complexity, etc. For the last control scheme (304n), the complexity of the scene exceeds the capabilities of any of the other control schemes, and therefore the user or driver is notified to take back control of the autonomous vehicle 10.

The autonomous system 300 further includes a control scheme selector 302 that selects a control scheme based on the determined complexity of the scene. A complexity measure 306 is received at the control scheme selector 302. The control scheme selector 302 compares the complexity measure 306 to various complexity thresholds. When the complexity measure is between a first threshold and second threshold, the control scheme selector 302 selects down to control scheme 1 (304a). When the complexity measure is between the second threshold and a third threshold, the control scheme selector 302 selects down to control scheme 2 (304b). This selection process continues until the last control scheme. When the complexity measure is greater than a maximum threshold, the control scheme selector 302 notifies the user to take control of the autonomous vehicle. ("Notify User" 304n)

Figure 4:
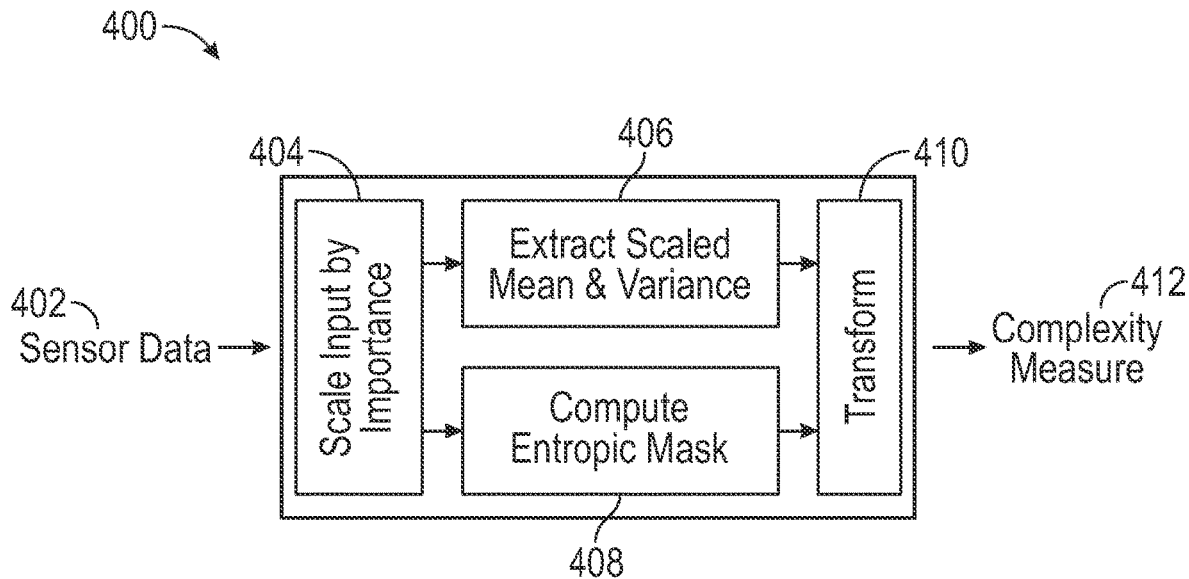
FIG. 4 shows a flowchart illustrating a method for determining an instantaneous complexity.

FIG. 4 shows a flowchart 400 illustrating a method for determining an instantaneous complexity, also referred to herein as a spatial complexity of an environment. Sensor data 402 is received, the sensor data including various parameters regarding the location, velocity, heading, etc. of one or more agents 50, as well as traffic rules and regulations, road types and road conditions, etc. In box 404, the sensor data is scaled or assigned a weight according to its importance to the autonomous vehicle 10. In box 406, a mean and variance for a parameters are determined. In box 408, an entropic mask is calculated. In box 410, calculations are made from the mean and variance as well as the entropic mask in order to obtain a complexity measure 412. The details of flowchart 400 are discussed below.

The instantaneous entropy score measures the complexity of a scene for an autonomous vehicle ($\alpha_{ego}$) at a particular time t.

$$\text{Agents} = \alpha_0, \alpha_1, \ldots, \alpha_n$$

$$A = \text{Agents} \setminus \{\alpha_{ego}\} \qquad \text{Eq. (1)}$$

where $\alpha_i$ represents the measured parameters of $i^{th}$ agent, such as range and Doppler data, which are received as sensor data 402. From the sensor data 402 obtained at the autonomous vehicle, the relative speed of an $i^{th}$ agent ($\Delta_{\alpha_i}^{speed}$) is determined as a difference between the autonomous vehicle speed and a speed of the $i^{th}$ agent, as shown in Eq. (2):

$$\Delta_{\alpha_i}^{speed} = |\alpha_{ego}^{speed} - \alpha_i^{speed}| \qquad \text{Eq. (2)}$$

Similarly, the relative heading of the $i^{th}$ agent ($\Delta_{\alpha_i}^{heading}$) can be determined as shown in Eq. (3):

$$\Delta_{\alpha_i}^{heading} = |\alpha_{ego}^{heading} - \alpha_i^{heading}| \qquad \text{Eq. (3)}$$

In box 404, a scaling function can be determined with respect to the autonomous vehicle $\alpha_{ego}$, by computing a distance between the autonomous vehicle and the $i^{th}$ agent $$dist_{\alpha_i} \approx \sqrt{(\alpha_{ego}^x - \alpha_i^x)^2 + (\alpha_{ego}^y - \alpha_i^y)^2} \qquad \text{Eq. (4)}$$

where $\alpha_{ego}^x$ is the x-component of the position of the autonomous vehicle and $\alpha_{ego}^y$ is the y-component of the position of the autonomous vehicle, $\alpha_i^x$ is the x-component of the position of the $i^{th}$ agent and $\alpha_i^y$ is the y-component of the position of the $i^{th}$ agent. The distance is then used to determine a scaling function or weighting C for the $i^{th}$ agent, as shown in Eq. (5)

$$C_{\alpha_i} = \frac{1}{1 + \exp(dist_i - r_{sensor}/2)} \qquad \text{Eq. (5)}$$

where $r_{sensor}$ is the maximum range of the sensor.

Once the scaling function has been calculated, then in box 406, a weighted mean velocity and weighted velocity variance can be determined by integrating the weighting with the selected features, as shown respectively in Eqs. (6) and (7):

$$\mu_\Delta = \sum_A \frac{C_{\alpha_i} \Delta_{\alpha_i}}{C_{\alpha_i}} \qquad \text{Eq. (6)}$$

$$\sigma_\Delta^2 = \frac{\sum_A C_{\alpha_i}}{\left(\sum_A C_{\alpha_i}\right)^2 - \sum_A C_{\alpha_i}^2} \sum_A C_{\alpha_i}(\Delta - \mu)^2 \qquad \text{Eq. (7)}$$

These two values, being the representative components of the scene for each features (heading and velocity) are combined as variance/mean to construct a coefficient of variability. This measurements is robust to local outliers and allows for relative comparisons utilized in the temporal formulation. An information entropic mask is constructed in order to represents the uncertainty in a scene. Using the standard formulation of Shannon's entropy:

$$E = K\Sigma p_i \log p_i \qquad \text{Eq. (8)}$$

Each sensor's measurement can be integrated. The simplest case, where only one sensor is used, yields the simple interpretation where there is complete uncertainty (E=1) for obstructed readings and complete certainty (E=0) for unobstructed readings. Therefore, the occluded area of the scene is determined in order to compute the uncertainty of the entire sensor area. In particular, the occluded area (box 408) can be computed by $$Area_{occluded} \approx \sum_A \left(\frac{1}{2} r_{sensor}^2 \theta - \frac{1}{2} dist_{\alpha_i}^2 \theta\right) \qquad \text{Eq. (8)}$$

where $\theta$ is an arc angle of an occluded region. The visible region is therefore $$Area_{visible} = \pi r^2 - Area_{occluded} \qquad \text{Eq. (9)}$$

The instantaneous complexity 412 can therefore be computed (box 410) as shown in Eq. (10):

$$E = \frac{Area_{occluded}}{Area_{visible} + Area_{occluded}} * \frac{\sigma_\Delta^2}{\mu_\Delta} \qquad \text{Eq. (10)}$$

Where a single number for complexity is required, the different features can simply be multiplied. For the example given above, the single complexity score can be represented as a product of a complexity for the velocity parameter and a complexity for the heading parameter, as shown in Eq. (11)

$$E = E^{velocity} * E^{heading} \qquad \text{Eq. (11)}$$

The above approach can be used to determine an instantaneous complexity. However, a temporal complexity scheme can be informative for selecting control schemes. Calculation of a temporal complexity is discussed below.

Figure 5:
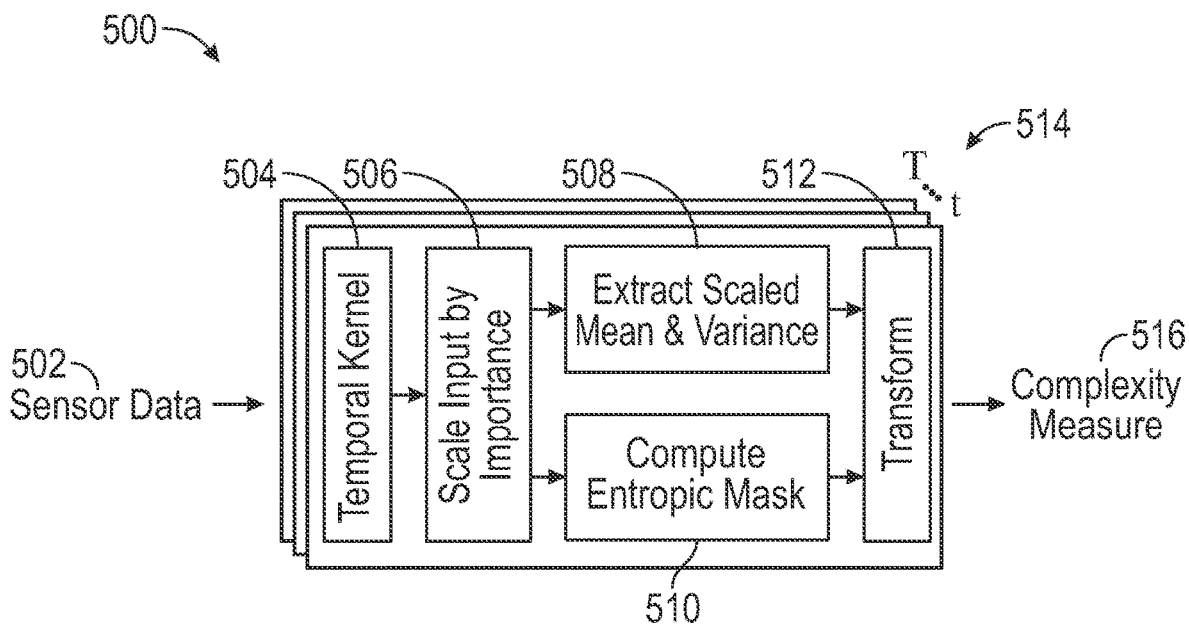
FIG. 5 shows a flowchart of a method for determining a temporal complexity.

FIG. 5 shows a flowchart 500 of a method for determining a temporal complexity. The temporal complexity difference in part due to application of a temporal kernel. Sensor data 502 is received over a selected time window having time length T. The time window can be a dynamic window in various aspects. The time window can be split up into a plurality of sub-windows. Boxes 504 through 512 are applied to each time sub-window, but are described with respect to the top sub-window. In box 504, the temporal kernel is applied to the sensor data for a selected sub-period of the time sub-window. In box 506, the sensor data of the sub-window is scaled or assigned a weight according to its importance to the autonomous vehicle. In box 508, a mean and variance for a parameters are determined within the selected sub-window. In box 510, an entropic mask is calculated for the sub-window. In box 512, calculations are made from the mean and variance as well as the entropic mask in order to obtain a complexity measure for the selected of the sub-window (similar to the complexity measure of Eq. (10). This procedure is repeated for every sub-window. The complexity measures for each sub-window are integrated at box 514 in order to obtain a temporal entropy complexity measure 516.

With respect to the temporal kernel of box 504, the temporal kernel scales the time frame so that more recent observations and data have more weight than more temporal distant observations and data.

The temporal frame is scaled using either a linear or a non-linear function $f_{scale}$. An illustrative kernel is shown in Eq. (12):

$$f_{scale}(t) = \frac{1}{1 + \exp(t - T/2)} \qquad \text{Eq. (12)}$$

where T is the full temporal window under consideration. Furthermore, because the frame of reference is considered to be non-stationary, a realignment of the autonomous vehicle $\alpha_{ego}$ is performed in order to ensure proper computations, such as with respect to the entropic mask.

The realignment of the autonomous vehicle 10 is described below in Eqs. (13) and (14):

$$\Delta_{x_j} = speed_{\alpha_{ego}} * \Delta t * \sin(\theta_{\alpha_{ego}}) \qquad \text{Eq. (13)}$$

$$\Delta_{y_j} = speed_{\alpha_{ego}} * \Delta t * \sin(\theta_{\alpha_{ego}}) \qquad \text{Eq. (14)}$$

The temporal information complexity can then be determined by addition of the complexity measures for each sub-window t, as shown in Eq. (15):

$$E = \frac{\sum_{t=0}^{T} f_{scale}(t) * \frac{A_{occluded}^{t}}{A_{occluded}^{t} + A_{visible}^{t}} * \frac{\sigma_{\Delta}^{2}}{\mu_{\Delta}}}{\sum_{t=0}^{T} \frac{1}{1 + \exp(t - T/2)}} \quad \text{Eq. (15)}$$

where $A^{t}_{occluded}$ is the occluded area during time sub-window t and $A^{t}_{visible}$ is the occluded area during time sub-window t.

The above method of determine complexity can be extended into a three-dimensional environment, if necessary, wherein the input is three-dimensional information regarding agents and the entropic masses can be three-dimensional or four dimensional for determining instantaneous and temporal complexity measures, respectively.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof

What is claimed is:

1. A method of operating an autonomous vehicle, comprising:
    receiving sensor data related to a plurality of agents at a processor of the autonomous vehicle, the sensor data including headings and velocities of the plurality of agents in an environment in which the autonomous vehicle is operating;
    determining a mean value and a variance in the value of the headings from the sensor data;
    determining a mean value and a variance in the value of the velocities from the sensor data;
    determining, at the processor, a heading-based instantaneous entropy score for the environment from the mean value of headings, the variance in the headings, and an area of an occluded region of the environment;
    determining, at the processor, a velocity-based instantaneous entropy score for the environment from the mean value of velocities, the variance in the velocities, and the area of the occluded region of the environment;
    determining a complexity score from a product of the velocity-based instantaneous entropy score and the heading-based instantaneous entropy score;
    selecting a control scheme for operating the autonomous vehicle based on the determined complexity score; and
    operating the autonomous vehicle using the selected control scheme.

2. The method of claim 1, wherein the complexity score is at least one of a temporal complexity and a spatial complexity.

3. The method of claim 2, wherein the complexity score is a temporal complexity, further comprising integrating a plurality of spatial complexities, each spatial complexity representing a spatial complexity at a selected time.

4. The method of claim 3, further comprising scaling each of the plurality of spatial complexities according to a temporal kernel.

5. The method of claim 4, wherein the temporal kernel provides greater weight to a spatial complexity from a recent time and less weight to a spatial complexity from a distant time.

6. A cognitive system for operating an autonomous vehicle, comprising:
    a sensor configured to obtain data of a plurality of agents, the data including headings and velocities of the plurality of agents in an environment in which the autonomous vehicle is operating;
    a processor configured to:
        determine a mean value and a variance in the value of the headings from the sensor data;
        determine a mean value and a variance in the value of the velocities from the sensor data;
        determine a heading-based instantaneous entropy score for the environment from the mean value of the headings, the variance in the value of the headings, and an area of an occluded region of the environment;
        determine a velocity-based instantaneous entropy score for the environment from the mean value of velocities, the variance in the velocities, and the area of the occluded region of the environment;
        determine a complexity score from a product of the velocity-based instantaneous entropy score and the heading-based instantaneous entropy score;
        select a control scheme for operating the autonomous vehicle based on the determined complexity score; and
        operate the autonomous vehicle using the selected control scheme.

7. The system of claim 6, wherein the complexity score is at least one of a temporal complexity and a spatial complexity.

8. The system of claim 7, wherein the processor is further configured to determine the temporal complexity by integrating a plurality of spatial complexities, each spatial complexity representing a spatial complexity at a selected time.

9. The system of claim 8, wherein the processor is further configured to scale each of the plurality of spatial complexities according to a temporal kernel.

10. The system of claim 9, wherein the temporal kernel provides greater weight to a spatial complexity from a recent time and less weight to a spatial complexity from a distant time.

11. An autonomous vehicle, comprising:
    a sensor configured to obtain data of a plurality of agents, the data including headings and velocities of the plurality of agents in an environment in which the autonomous vehicle is operating;
    a processor configured to:
        determining a mean value and a variance in the value of the velocities from the sensor data;
        determine a mean value and a variance in the value of the headings from the sensor data;
        determine a heading-based instantaneous entropy score for the environment from the-mean value of the headings, the variance in the value of the headings, and an area of an occluded region of the environment;
        determine a velocity-based instantaneous entropy score for the environment from the mean value of velocities, the variance in the velocities, and the area of the occluded region of the environment;

determine a complexity score from a product of the velocity-based instantaneous entropy score and the heading-based instantaneous entropy score;

select a control scheme for operating the autonomous vehicle based on the determined complexity score; and operate the autonomous vehicle using the selected control scheme.

12. The vehicle of claim 11, wherein the complexity score is at least one of a temporal complexity and a spatial complexity.

13. The vehicle of claim 12, wherein the processor is further configured to determine the temporal complexity by integrating a plurality of spatial complexities, each spatial complexity representing a spatial complexity at a selected time.

14. The vehicle of claim 13, wherein the processor is further configured to scale each of the plurality of spatial complexities according to a temporal kernel that provides greater weight to a spatial complexity from a recent time and less weight to a spatial complexity from a distant time.

* * * * *